(12) United States Patent
Aten et al.

(10) Patent No.: US 10,899,463 B2
(45) Date of Patent: Jan. 26, 2021

(54) SEGMENTED PYLON FOR AN AIRCRAFT PROPULSION SYSTEM

(71) Applicant: Rohr, Inc., Chula Vista, CA (US)

(72) Inventors: Michael Aten, San Diego, CA (US); Anthony Lacko, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 289 days.

(21) Appl. No.: 15/981,054

(22) Filed: May 16, 2018

(65) Prior Publication Data

US 2018/0334259 A1 Nov. 22, 2018

Related U.S. Application Data

(60) Provisional application No. 62/506,790, filed on May 16, 2017.

(51) Int. Cl.
*B64D 27/26* (2006.01)
*B64D 27/18* (2006.01)
*B64F 5/40* (2017.01)

(52) U.S. Cl.
CPC ............. *B64D 27/26* (2013.01); *B64D 27/18* (2013.01); *B64D 2027/264* (2013.01); *B64F 5/40* (2017.01)

(58) Field of Classification Search
CPC .. B64D 27/26; B64D 27/18; B64D 2027/264; B64C 3/32; B64F 5/40
USPC ........................................................ 244/54
See application file for complete search history.

(56) References Cited

U.S. PATENT DOCUMENTS

| | | | |
|---|---|---|---|
| 3,666,211 A * | 5/1972 | Cathers | B64D 27/20 244/54 |
| 5,136,839 A | 8/1992 | Armstrong | |
| 5,524,847 A * | 6/1996 | Brodell | B64C 7/02 244/54 |
| 5,775,638 A | 7/1998 | Duesler | |
| 6,179,249 B1 * | 1/2001 | Canadas | B64D 29/00 244/129.4 |
| 6,485,247 B1 | 11/2002 | Groves et al. | |
| 8,262,050 B2 | 9/2012 | Linz | |
| 8,469,309 B2 | 6/2013 | Stuart et al. | |
| 8,523,516 B2 | 9/2013 | Vauchel et al. | |
| 8,739,552 B2 | 6/2014 | Vauchel et al. | |
| 9,010,680 B2 * | 4/2015 | Morvant | B64D 33/04 244/54 |
| 9,188,026 B2 | 11/2015 | Calder et al. | |
| 9,481,470 B2 | 11/2016 | West | |
| 9,573,695 B2 | 2/2017 | Suciu et al. | |

(Continued)

FOREIGN PATENT DOCUMENTS

| | | | |
|---|---|---|---|
| CA | 2889081 A1 * | 10/2015 | ............. B64D 27/26 |
| EP | 3437999 A1 * | 2/2019 | ............. B64D 27/18 |

(Continued)

*Primary Examiner* — Christopher P Ellis
(74) *Attorney, Agent, or Firm* — Getz Balich LLC

(57) ABSTRACT

An assembly is provided for an aircraft. This aircraft assembly includes an aircraft propulsion system and a pylon configured to mount the aircraft propulsion system to an airframe member. The pylon includes a first pylon structure and a second pylon structure. The first pylon structure is configured to mount to the airframe member. The second pylon structure is mounted to the aircraft propulsion system. The second pylon structure is configured to disconnect from the first pylon structure while mounted to the airframe member.

10 Claims, 9 Drawing Sheets

(56) References Cited

U.S. PATENT DOCUMENTS

| | | | | |
|---|---|---|---|---|
| 2010/0193627 | A1* | 8/2010 | Lafont | B64D 27/26 |
| | | | | 244/54 |
| 2011/0290935 | A1* | 12/2011 | Machado | B64F 5/00 |
| | | | | 244/54 |
| 2015/0144732 | A1* | 5/2015 | Peyruseigt | B64D 29/06 |
| | | | | 244/54 |
| 2015/0251768 | A1* | 9/2015 | Woolley | B64D 29/02 |
| | | | | 244/54 |
| 2015/0300293 | A1 | 10/2015 | Suciu et al. | |
| 2015/0361828 | A1* | 12/2015 | Suciu | F01D 25/28 |
| | | | | 415/213.1 |
| 2016/0229545 | A1* | 8/2016 | Pautis | B64C 3/187 |
| 2016/0244174 | A1* | 8/2016 | Pautis | B64D 27/18 |
| 2017/0088279 | A1* | 3/2017 | Castelli | B64D 27/26 |
| 2017/0240288 | A1* | 8/2017 | Pautis | B64D 27/26 |
| 2018/0178923 | A1* | 6/2018 | Petrissans-Lloveras | |
| | | | | B64D 27/26 |
| 2018/0346137 | A1* | 12/2018 | West | B64D 27/26 |
| 2019/0031361 | A1* | 1/2019 | McCullough | B64C 29/02 |
| 2019/0100324 | A1* | 4/2019 | Journade | B64D 27/26 |
| 2019/0112074 | A1* | 4/2019 | Dostes | B64D 27/26 |
| 2019/0127074 | A1* | 5/2019 | Colmagro | B64D 27/26 |
| 2019/0135445 | A1* | 5/2019 | Combes | B64D 27/26 |
| 2019/0233129 | A1* | 8/2019 | Lafont | B64C 3/185 |
| 2019/0300144 | A1* | 10/2019 | Campbell | F02B 77/11 |

FOREIGN PATENT DOCUMENTS

| | | | | |
|---|---|---|---|---|
| EP | 3505448 | A1 * | 7/2019 | B64D 27/26 |
| EP | 3572330 | A1 * | 11/2019 | F02C 7/20 |
| EP | 3572335 | A1 * | 11/2019 | F01D 25/285 |
| WO | 1993006008 | | 4/1993 | |
| WO | 2012085388 | | 6/2012 | |

* cited by examiner

SEGMENTED PYLON FOR AN AIRCRAFT PROPULSION SYSTEM

CROSS-REFERENCE TO RELATED APPLICATIONS

This application claims priority to U.S. Provisional Patent Appln. No. 62/506,790 filed May 16, 2017, which is hereby incorporated herein by reference in its entirety.

BACKGROUND

1. Technical Field

This disclosure relates generally to an aircraft and, more particularly, to mounting an aircraft propulsion system to an airframe.

2. Background Information

A modern aircraft such as a passenger airliner typically includes two or more turbofan engine propulsion systems. Each propulsion system is mounted under a respective wing by a pylon. To remove a propulsion system from the aircraft, the propulsion system may be disconnected from the pylon and then lowered vertically down and away from the wing. Alternatively, the entire pylon may be disconnected from the wing and then the pylon and the propulsion system may be lowered vertically down and away from the wing. While known pylons have various advantages, there is still room in the art for improvement. For example, disconnecting a typical pylon from a wing is relatively time consuming as one or more panels of the wing must be removed to gain access to mounting hardware and supply lines routed between the propulsion system and the wing. As a result, propulsion system maintenance and repair is typically performed on-wing opposed to off-wing and/or in a controlled environment.

SUMMARY OF THE DISCLOSURE

According to an aspect of the present disclosure, an assembly is provided for an aircraft. This aircraft assembly includes an aircraft propulsion system and a pylon configured to mount the aircraft propulsion system to an airframe member. The pylon includes a first pylon structure and a second pylon structure. The first pylon structure is configured to mount to the airframe member. The second pylon structure is mounted to the aircraft propulsion system. The second pylon structure is configured to disconnect from the first pylon structure while mounted to the airframe member.

According to another aspect of the present disclosure, another assembly is provided for an aircraft. This aircraft assembly includes an aircraft wing, an aircraft propulsion system and a pylon configured to mount the aircraft propulsion system to the aircraft wing. The pylon includes a first pylon structure and a second pylon structure. The first pylon structure is arranged below and mounted to the aircraft wing. The second pylon structure is arranged below and mounted to the aircraft propulsion system. The second pylon structure is configured to disconnect from the first pylon structure for removal of the aircraft propulsion system from the aircraft wing.

According to still another aspect of the present disclosure, another assembly is provided for an aircraft. This aircraft assembly includes an airframe member, an aircraft propulsion system and a pylon configured to mount the aircraft propulsion system to the airframe member. The pylon includes a first pylon structure and a second pylon structure. The first pylon structure is arranged below and mounted to the airframe member. The second pylon structure is arranged below and mounted to the aircraft propulsion system. The second pylon structure is removably attached to the first pylon structure. An engine and aircraft systems line includes a first segment and a second segment removably coupled to the first segment at an interface between the first pylon structure and the second pylon structure. The first segment is arranged with the first pylon structure. The second segment is arranged with the second pylon structure.

The second pylon structure may be configured to disconnect from the first pylon structure for horizontal removal of the aircraft propulsion system from the airframe member.

The second pylon structure, while mounted to the aircraft propulsion system, may be configured to disconnect from the first pylon structure by translating along a generally horizontal axis.

The second pylon structure may be configured to disconnect from the first pylon structure by moving along a generally horizontal axis.

The horizontal axis may be substantially parallel to a rotational axis of the aircraft propulsion system.

The first pylon structure may include a first mounting structure. The second pylon structure may include a second mounting structure configured to nest with the first mounting structure.

The second mounting structure may be configured to slidably nest with the first mounting structure when the second pylon structure is being mated with the first pylon structure. The second mounting structure may also or alternatively be configured to slidably decouple from the first mounting structure when the second pylon structure is being disconnected from the first pylon structure.

The second mounting structure may be configured to nest within the first mounting structure. Alternatively, the first mounting structure may be configured to nest within the second mounting structure.

The second mounting structure may be configured as or otherwise include a tubular structure.

The assembly may include a first line and a second line. The second mounting structure may also include a partition configured to separate an interior bore of the tubular structure into a first passage and a second passage. The first line may be in the first passage. The second line may be in the second passage.

The first line may be a fuel line or any other line that carries a fluid such as hydraulic fluid. The second line may be an electrical line or any other line that carries non-fluid; e.g., electricity.

The second mounting structure may be configured as or otherwise include a beam.

The assembly may include a fluid line, which may include a first segment and a second segment removably coupled to the first segment at an interface between the first pylon structure and the second pylon structure. The first segment may be arranged with the first pylon structure and the second segment may be arranged with the second pylon structure.

The fluid line may be a fuel line.

The assembly may include a non-fluid line, which may include a first segment and a second segment removably coupled to the first segment at an interface between the first pylon structure and the second pylon structure. The first segment may be arranged with the first pylon structure and the second segment is arranged with the second pylon structure.

The non-fluid line may be an electrical line.

The assembly may include the airframe member. The airframe member may be configured as an aircraft wing.

The aircraft wing may include a first wing structure and a second wing structure configured to disconnect from the first wing structure when the second pylon structure is disconnected from the first pylon structure. The second wing structure may form a portion of a trailing edge of the aircraft wing and may be mounted to the second pylon structure.

The pylon may be further configured to mount the aircraft propulsion system at least substantially vertically above the airframe member.

The pylon may be further configured to mount the aircraft propulsion system at least substantially aft of the airframe member.

The aircraft propulsion system may be configured as or otherwise include a gas turbine engine.

The first pylon structure may be connected to the second pylon structure at a butt joint.

The foregoing features and the operation of the invention will become more apparent in light of the following description and the accompanying drawings.

DETAILED DESCRIPTION

Figure 1:
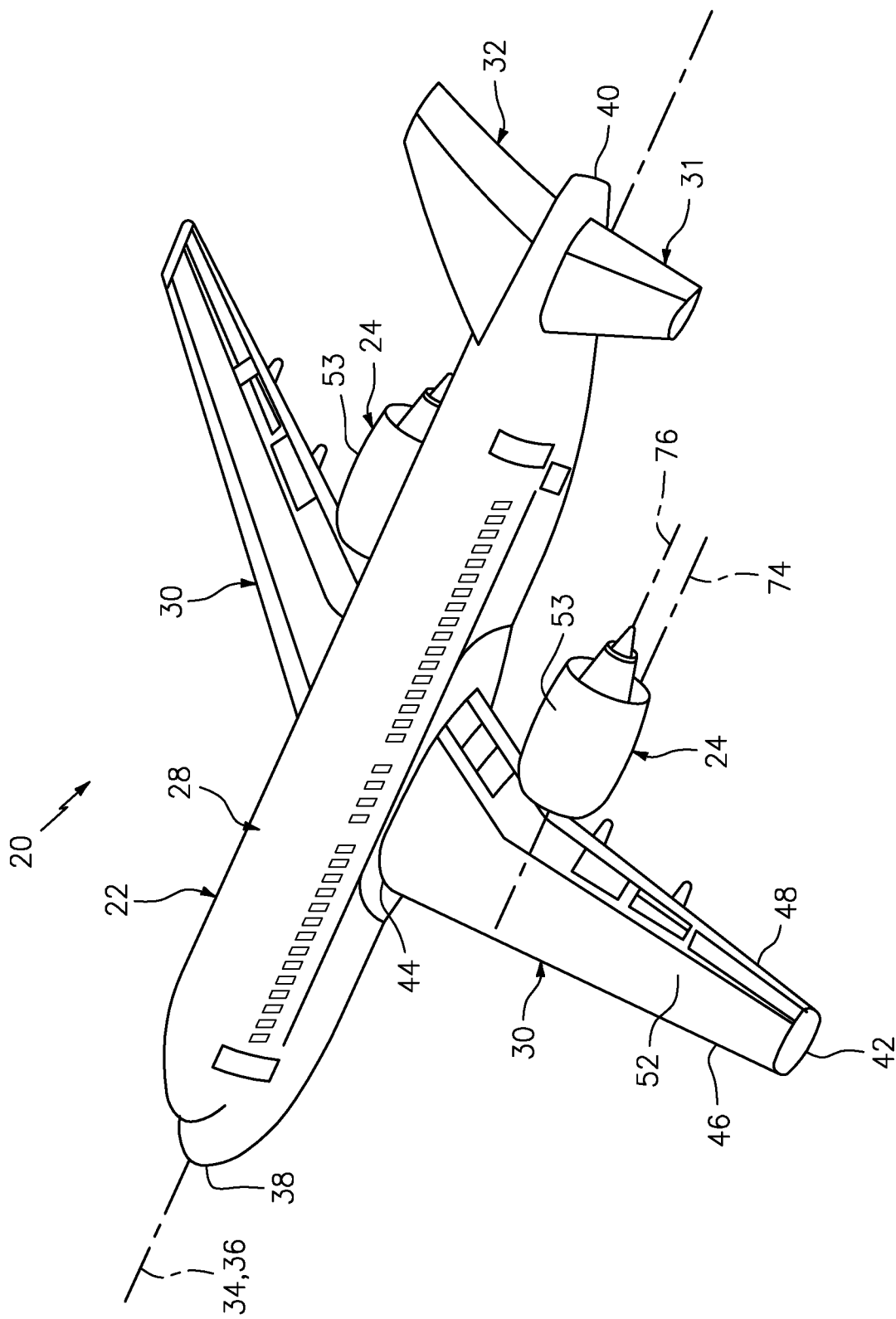
FIG. 1 is a perspective illustration of an aircraft.

FIG. 1 is a perspective illustration of an aircraft 20. This aircraft 20 is configured as a jet airplane such as a commercial airliner or a cargo plane; however, the present disclosure is not limited to such exemplary aircraft. The aircraft 20 includes an airframe 22 and one or more aircraft propulsion systems 24. The aircraft 20 also includes one or more pylons 26 (see FIG. 2), which respectively mount the propulsion systems 24 to the airframe 22.

The airframe 22 includes a plurality of airframe members such as a fuselage 28 and a plurality of wings 30-32. The fuselage 28 forms a central body of the aircraft 20 and has a horizontal longitudinal axis 34. Herein, the term "horizontal" is used to describe a gravitational orientation of an element (e.g., the longitudinal axis 34) when the aircraft 20 is on ground and/or in level flight.

The longitudinal axis 34 may be coaxial with a roll axis 36 of the aircraft 20. Briefly, the roll axis 36 is perpendicular to a yaw axis and a pitch axis of the aircraft 20 (not shown). The roll axis 36 extends from an origin (e.g., a center of gravity of the aircraft 20) in a direction towards the aircraft nose 38 and an opposite direction towards the aircraft tail 40. Roll axis motion thereby results in up and down movement of tips 42 of the wings 30.

The plurality of wings include one or more horizontal main or general lift wings 30, one or more horizontal stabilizer wings 31 (only one shown in FIG. 1) and at least one vertical stabilizer wing 32. The main wings 30 are disposed on and connected to opposing sides of the fuselage 28. Each of the main wings 30 extends in span from a base 44 to its respective tip 42, where the base 44 is connected to the fuselage 28. Each of the main wings 30 extends in chord from a forward leading edge 46 to an aft trailing edge 48. Each of the main wings 30 also extends vertically between a bottom side 50 (see FIG. 3) and a top side 52.

The horizontal stabilizer wings 31 are disposed on and connected to the opposing sides of the fuselage 28 at (e.g., on, adjacent or proximate) the aft, tail end 40 of the fuselage 28. The vertical stabilizer wing 32 projects vertically out from and is connected to the fuselage 28 at the tail end 40. Herein, the term "vertical" is used to describe a gravitational orientation of an element (e.g., the vertical stabilizer wing 32) when the aircraft 20 is on ground and/or in level flight.

Each propulsion system 24 includes a gas turbine engine housed within a nacelle 53. The gas turbine engine may be configured as a turbofan engine as shown in FIG. 1. Alternatively, the gas turbine engine may be configured as a turbojet engine, a propfan engine, a pusher engine or any other type of gas turbine engine capable of propelling the aircraft 20.

Figure 2:
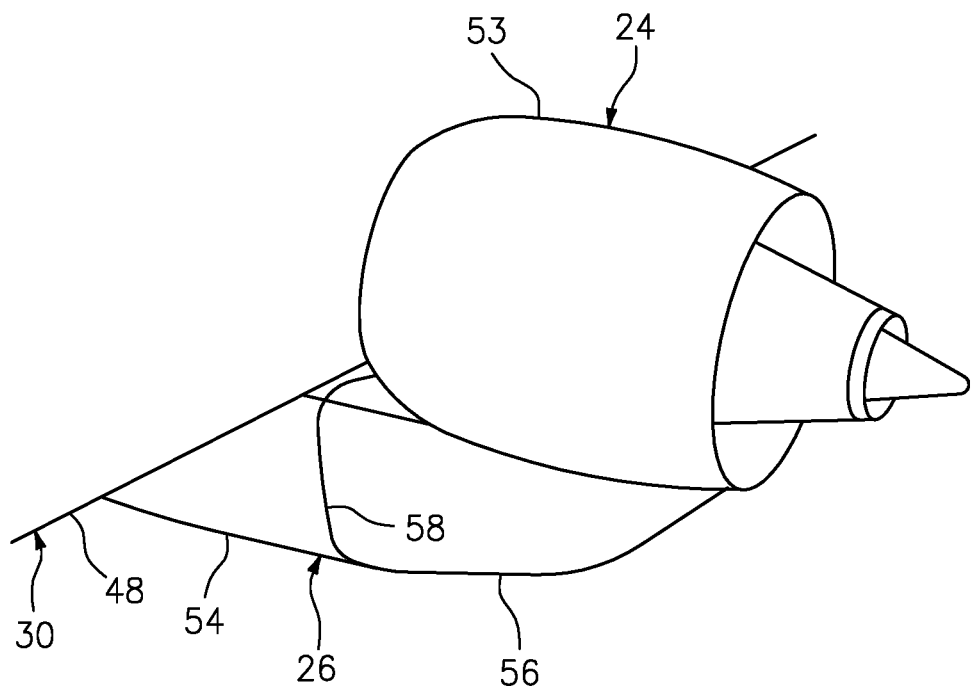
FIG. 2 is a perspective illustration of a portion of a wing, a propulsion system and a pylon mounting the propulsion system to the wing.
Figure 3:
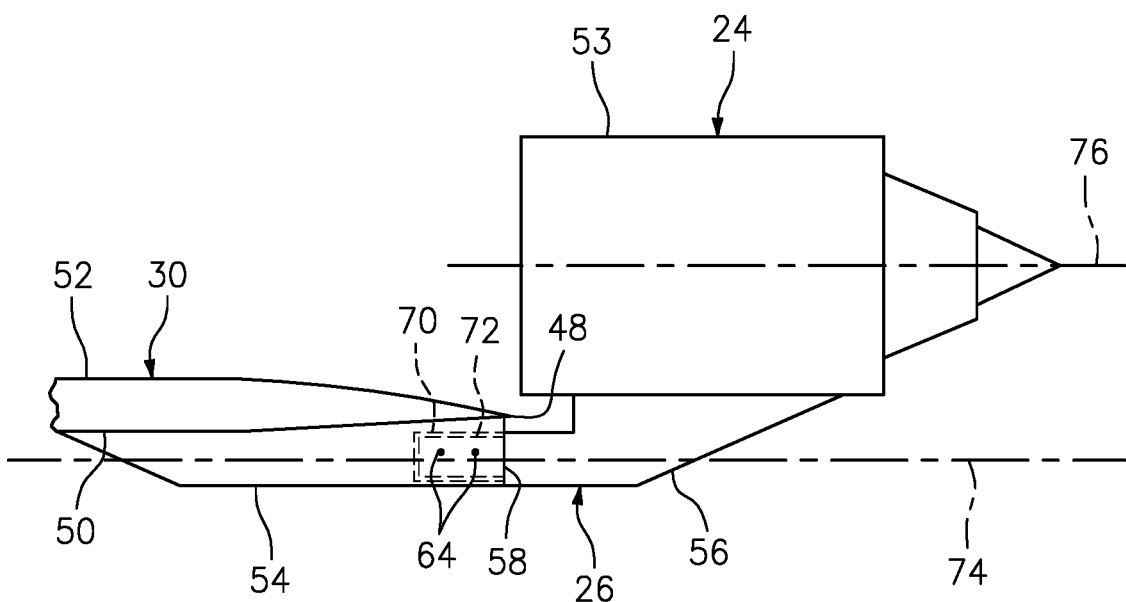
FIG. 3 is a side schematic illustration of the wing, the propulsion system and the pylon.

Referring to FIGS. 2 and 3, each pylon 26 is configured to mount the respective propulsion system 24 to one of the members of the aircraft 20. In the specific embodiment of FIGS. 2 and 3, the pylon 26 mounts the propulsion system 24 to the respective main wing 30. However, in other embodiments, the pylon 26 may alternatively connect the respective propulsion system 24 to another airframe member.

Referring again to FIGS. 2 and 3, the pylon 26 includes a first (e.g., forward) pylon structure 54 and a second (e.g., aft) pylon structure 56. The first pylon structure 54 is fixedly mounted to a respective main wing 30; e.g., aircraft member. In the specific embodiment of FIGS. 2 and 3, the first pylon structure 54 is arranged vertically below the main wing 30 and longitudinally at the trailing edge 48. The second pylon structure 56 is fixedly mounted to a respective propulsion system 24. In the specific embodiment of FIGS. 2 and 3, the second pylon structure 56 is arranged vertically below the propulsion system 24. With this configuration, the propulsion system 24 is at least substantially (or completely)

vertically above the main wing 30 at least relative to the trailing edge 48. The propulsion system 24 is also at least substantially (or completely) longitudinally aft of the main wing 30. The present disclosure, however, is not limited to such propulsion system 24 placement. For example, in other embodiments, the propulsion system 24 may be located forward of and/or below the aircraft member; e.g., the main wing 30.

The pylon structures 54 and 56 of FIG. 3 are configured to mate with one another at an interface 58 to at least partially or completely form the pylon 26. However, the pylon structures 54 and 56 are configured as discrete and severable bodies. This enables the second pylon structure 56 to be disconnected from the first pylon structure 54 while the first pylon structure 54 is still mounted to the main wing 30 and the second pylon structure 56 is still mounted to the propulsion system 24. In this manner, the propulsion system 24 and the second pylon structure 56 may be removed from the aircraft 20 as a single module.

Figure 4:
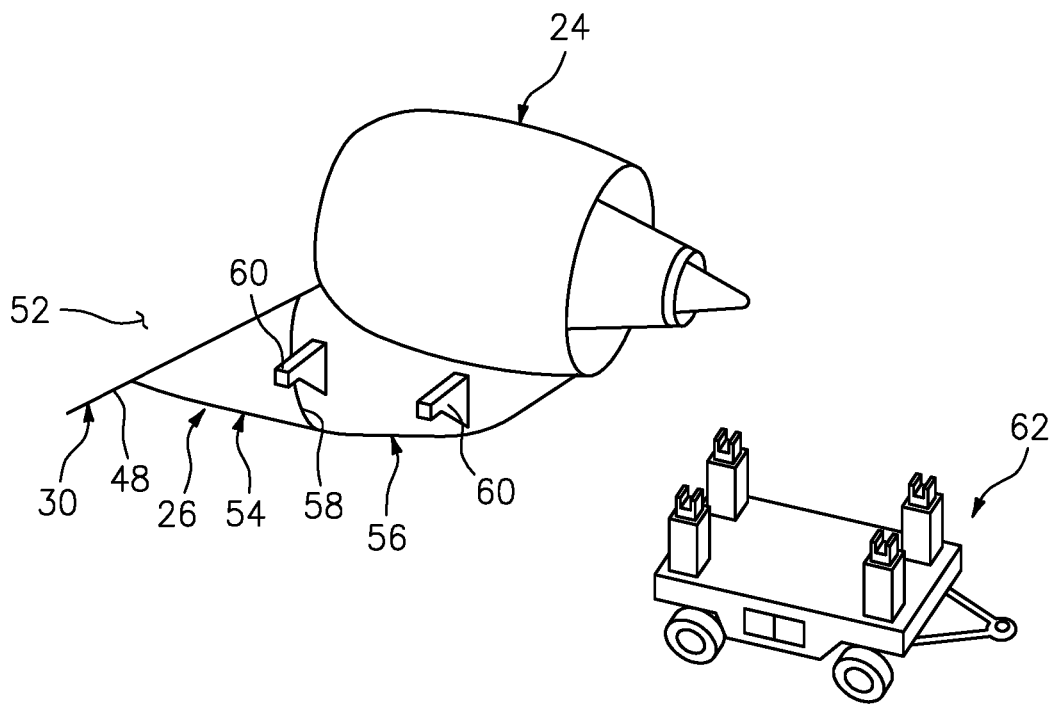
FIG. 4 is a perspective illustration of the wing, the propulsion system and the pylon proximate a vehicle for removing the propulsion system from the wing.
Figure 5:
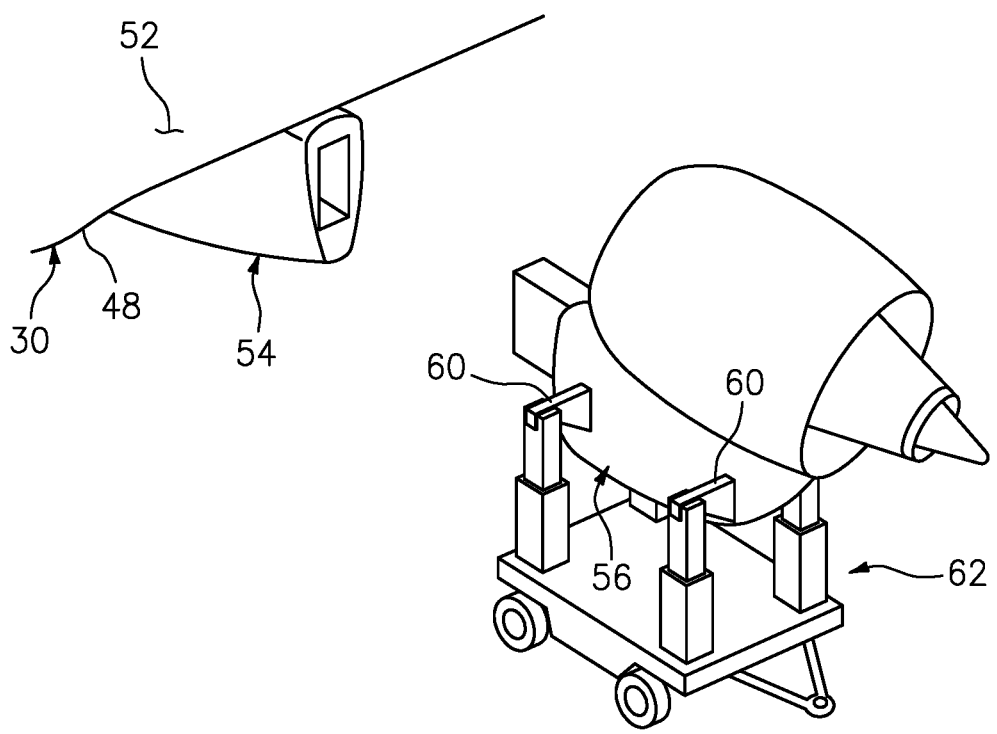
FIG. 5 is a perspective illustration of the wing, the propulsion system and the pylon, where the propulsion system is supported by the vehicle and removed from the wing.
Figure 15:
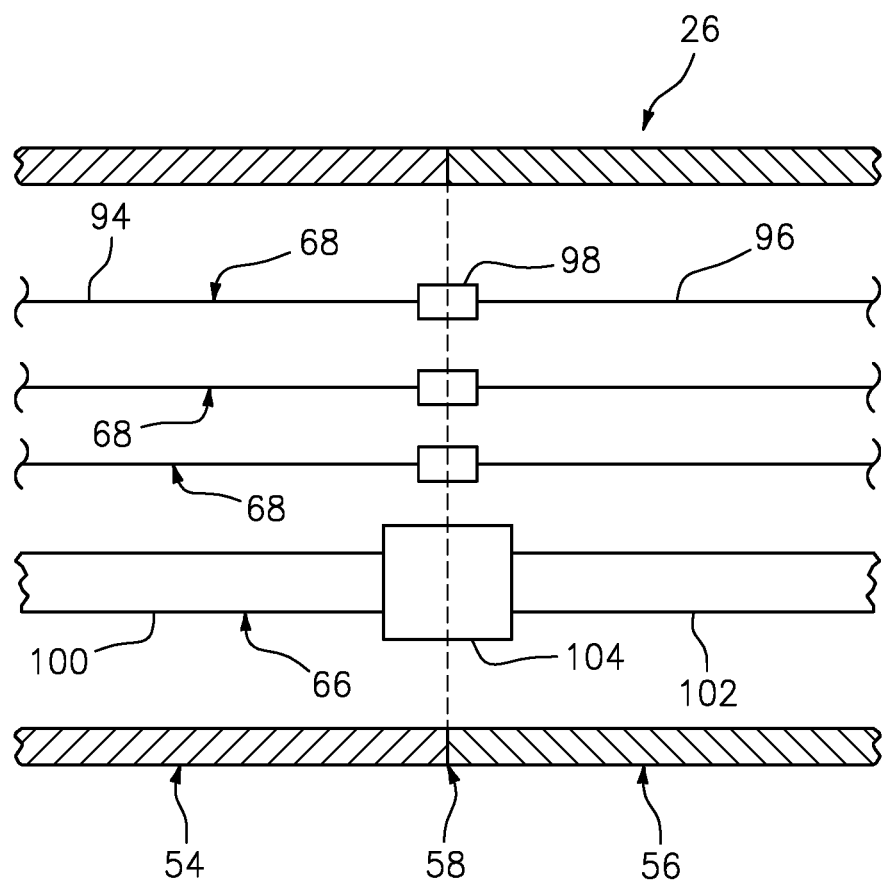
FIG. 15 is a schematic illustration of a plurality of engine and aircraft systems lines within a pylon at an interface between first and second pylon structures.

For example, as shown in FIGS. 4 and 5, one or more mounts 60 may be removably attached to the second pylon structure 56. A vehicle 62 such as a trailerable cart may be positioned beneath the second pylon structure 56 and then mated with the mounts 60. After one or more mechanical fasteners 64 (see FIG. 3) that secure the pylon structures 54 and 56 together are removed and/or one or more engine and aircraft systems lines 66 and 68 (see FIG. 15) running through the pylon 26 are decoupled, the vehicle 62 may be pulled horizontally away from the main wing 30 thereby completely disconnecting and separating the second pylon structure 56 from the first pylon structure 54. Note, while FIG. 15 illustrates a single line 66 and a plurality of lines 68, the present disclosure is not limited thereof. For example, in other embodiments, there can be more than one line 66 and/or a single line 68.

The foregoing severable configuration between the pylon structures 54 and 56 enables the second pylon structure 56 to be designed and/or manufactured by the entity designing and/or manufacturing the propulsion system 24. This may enable improved integration of the second pylon structure 56 with the propulsion system 24. Similarly, the severable configuration between the pylon structures 54 and 56 enables the first pylon structure 54 to be designed and/or manufactured by the entity designing and/or manufacturing the airframe 22. This may enable improved integration of the first pylon structure 54 with the respective airframe member; e.g., the main wing 30. By contrast, a typical prior art aircraft may be designed and manufactured by at least three different entities, where one entity is responsible for the airframe, another entity is responsible for the propulsion system, and still another entity is responsible for the pylon.

The severable configuration between the pylon structures 54 and 56 also enables a decrease in aircraft downtime. For example, replacing a component of the nacelle on-wing may be difficult because required positioning jigs and other tools may not readily be available. However, since the propulsion system 24 and the second pylon structure 56 may be removed as a module, that module may be relatively easily brought to a hanger or other controlled environment. The module may then be oriented, independent of the airframe member, for use with jigs, etc. Furthermore, where repair or maintenance of the propulsion system 24 will take longer than desired, another (e.g., replacement) propulsion system 24 may be configured with the aircraft 20.

Figure 6:
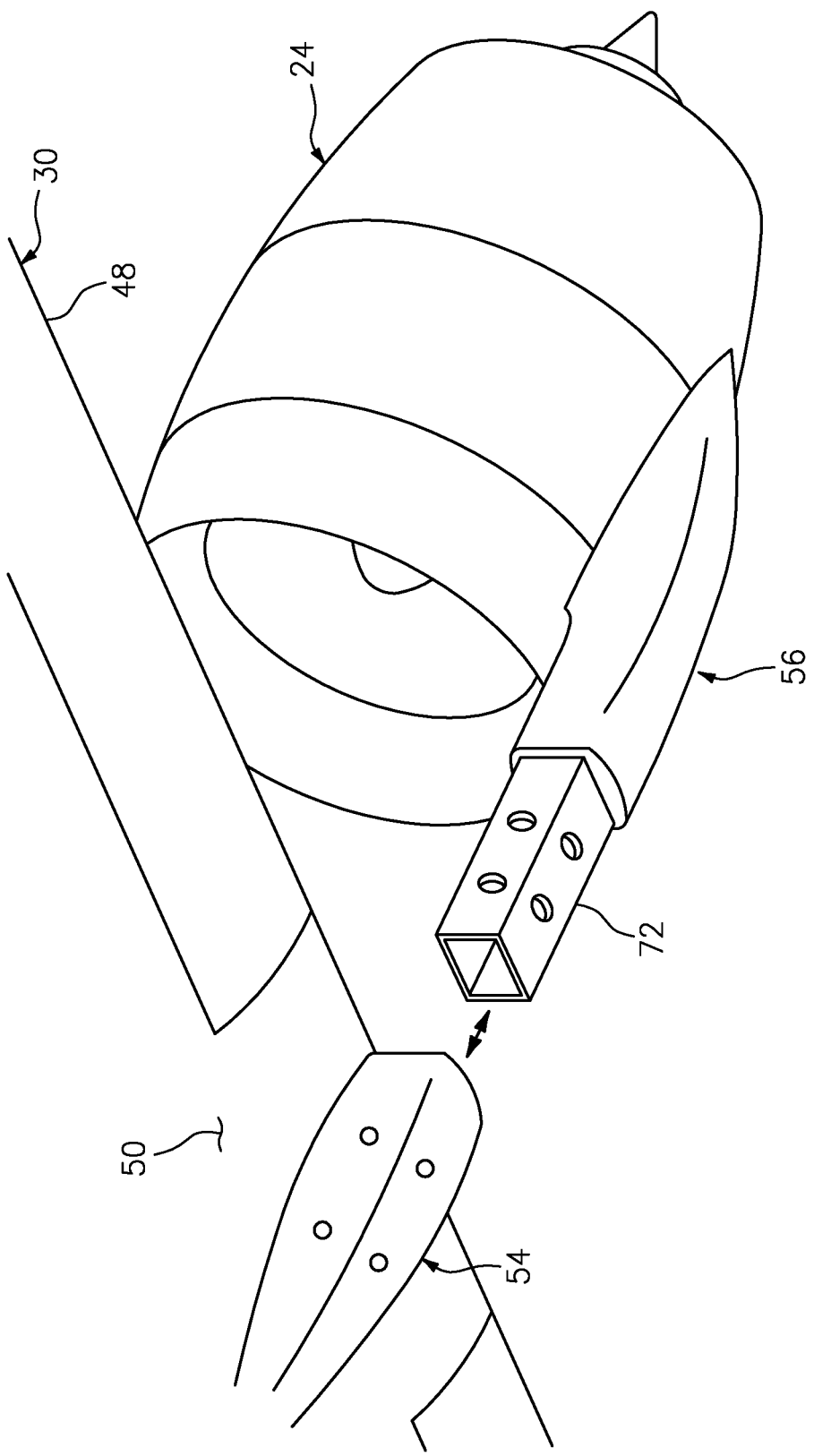
FIG. 6 is an exploded perspective illustration of the assembly of FIG. 2.
Figure 7:
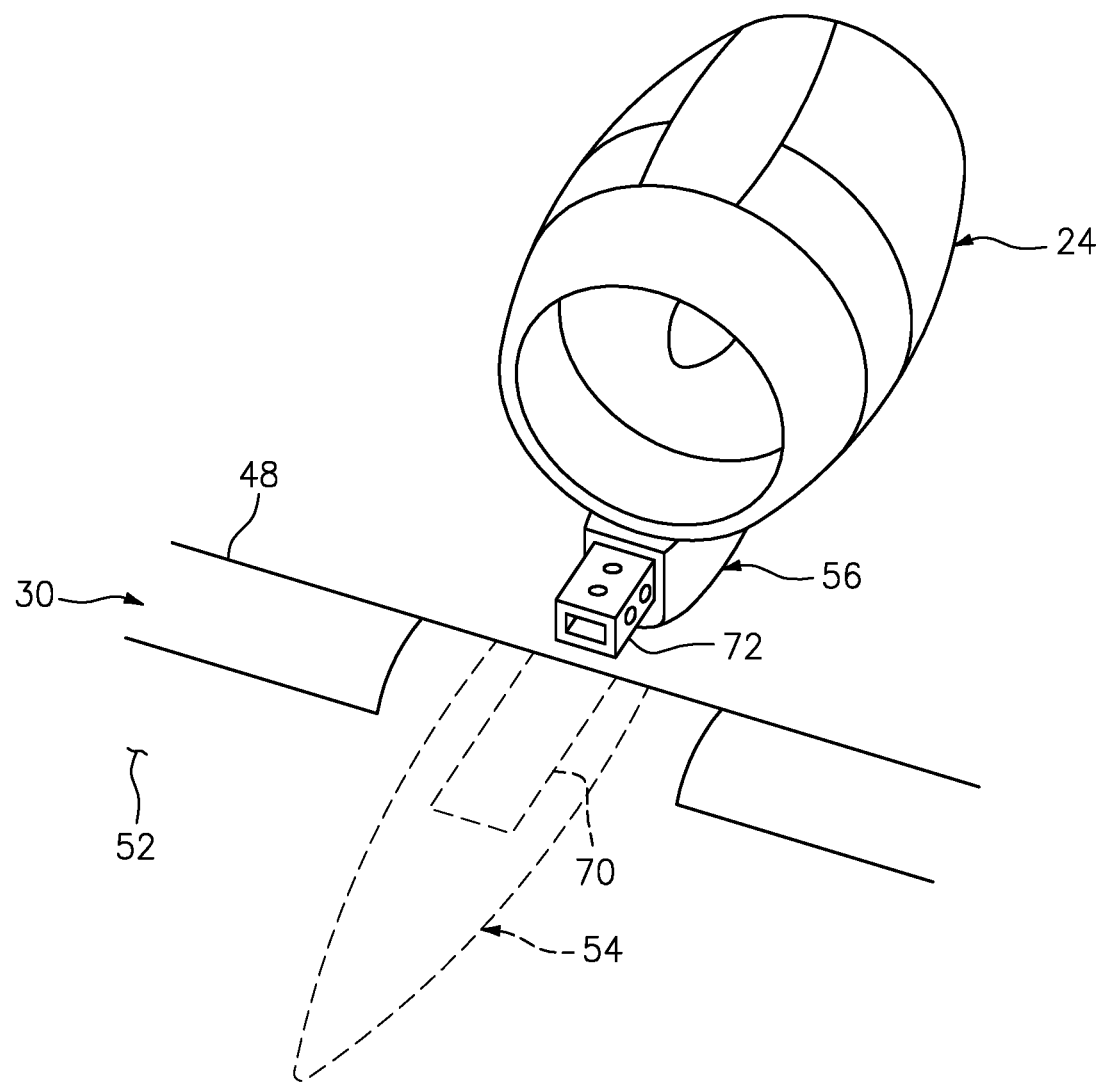
FIG. 7 is another exploded perspective illustration of the assembly of FIG. 2.

Various joints may be employed to connect the pylon structures 54 and 56 together. One such exemplary joint is shown in FIGS. 3, 6 and 7. In this exemplary embodiment, the pylon structures 54 and 56 are respectively configured with nesting mounting structures 70 and 72; e.g., nesting tubes. For example, the first pylon structure 54 includes the first mounting structure 70 such as an internal tubular mounting structure. The second pylon structure 56 includes the second mounting structure 72 such as an external tubular mounting structure. This second mounting structure 72 is configured to be received within and thereby nested with a bore of the first mounting structure 70. In this manner, the first and the second mounting structures 70 and 72 provide a sleeved joint between the first and the second pylon structures 54 and 56.

Each of the mounting structures 70 and 72 may be configured to extend along a generally horizontal axis 74 as shown in FIG. 3. The second pylon structure 56 therefore may be disconnected from the first pylon structure 54 by moving (e.g., translating) along the horizontal axis 74; e.g., while arranged with the vehicle 62 shown in FIG. 5. Referring to FIG. 1, the horizontal axis 74 may be substantially parallel with a rotational axis 76/centerline of the propulsion system 24 and/or the longitudinal axis 34 of the aircraft 20. Alternatively, the horizontal axis 74 may be slightly angularly offset from the rotational axis 76 and/or the longitudinal axis 34 by, for example, between one and ten degrees.

Figure 8:
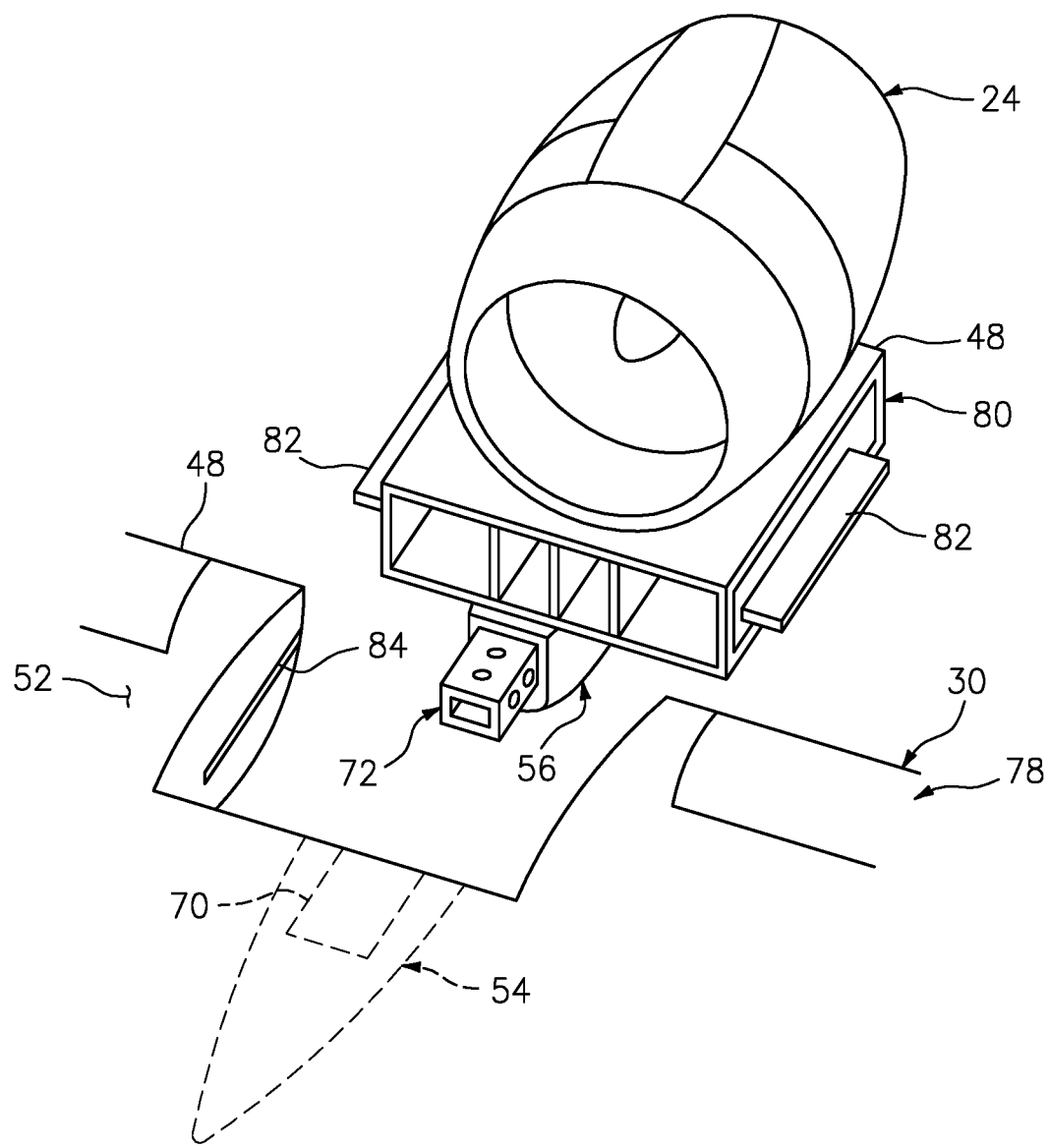
FIG. 8 is an exploded perspective illustration of another aircraft assembly.

In the embodiment shown in FIG. 7, the second pylon structure 56 is configured discrete from the main wing 30. However, in other embodiments, the second pylon structure 56 may be configured with a segment of the main wing 30. For example, the main wing 30 of FIG. 8 includes a first (e.g., major) wing structure 78 and a second (e.g., minor) wing structure 80. The first wing structure 78 forms a major portion (e.g., at least 75 percent) of the main wing 30. In contrast, the second wing structure 80 forms a minor portion (e.g., less than 25 percent) of the main wing 30. The second wing structure 80 of FIG. 7, in particular, forms a relatively small spanwise segment of the trailing edge 48. The second wing structure 80 may be mounted to the second pylon structure 56. With such a configuration, the second wing structure 80, the second pylon structure 56 and the propulsion system 24 may be removed from the airframe 22 as a single module.

In some embodiments, the second wing structure 80 may include one or more alignment features 82; e.g., rails or blades. These alignment features 82 may be configured to mate with corresponding alignment features 84 (e.g., grooves or channels) in the first wing structure 78.

Figure 9:
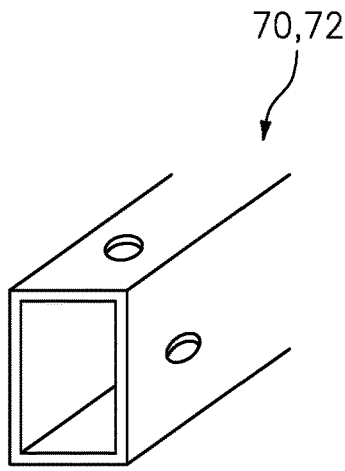
FIG. 9 is a partial perspective illustration of a mounting structure.
Figure 10:
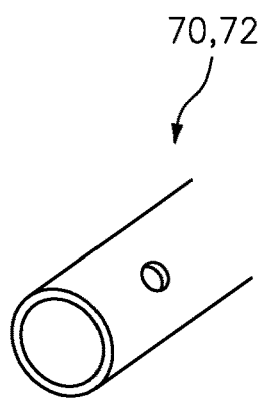
FIG. 10 is a partial perspective illustration of another mounting structure.
Figure 11:
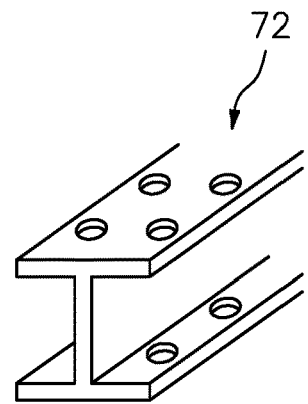
FIG. 11 is a partial perspective illustration of still another mounting structure.

In some embodiments, each of the mounting structures 70 and 72 may have a polygonal (e.g., rectangular, square, triangular, etc.) cross-sectional geometry when viewed in a plane perpendicular to the horizontal axis 74. For example, referring to FIG. 9, each mounting structure 70, 72 may have a rectangular cross-sectional geometry. In other embodiments, referring to FIG. 10, each of the mounting structures 70 and 72 may have a circular (or oval, elliptical, etc.) cross-sectional geometry. In still other embodiments, the second mounting structure 72 may be configured as a structural beam rather than a tubular structure as shown in FIGS. 9 and 10. For example, referring to FIG. 11, the second mounting structure 72 may be configured as an I-beam. With such a configuration, the first mounting structure 70 may be configured as a (e.g., rectangular) tubular structure (e.g., as shown in FIG. 9), or otherwise configured to more tightly follow the geometry around an I-beam cross-section.

Figure 12:
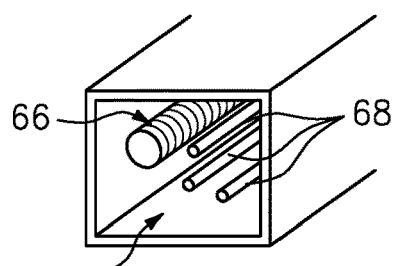
FIG. 12 is a partial perspective illustration of a mounting structure with a plurality of engine and aircraft systems lines.
Figure 13:
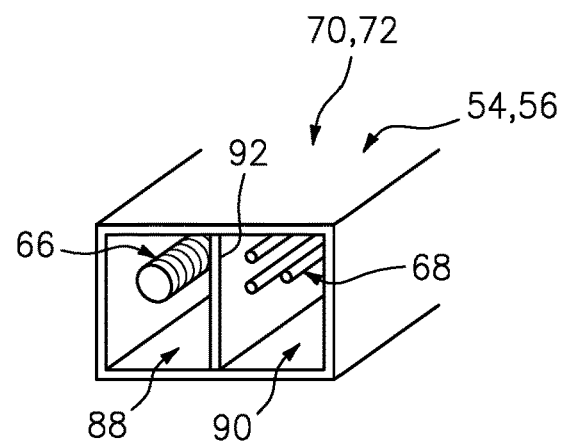
FIG. 13 is a partial perspective illustration of another mounting structure with a plurality of engine and aircraft systems lines.
Figure 14:
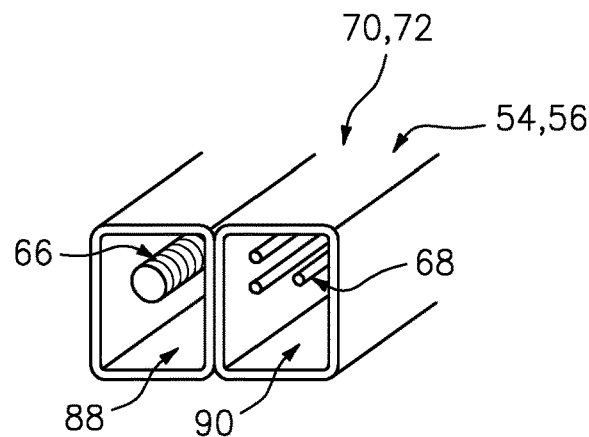
FIG. 14 is a partial perspective illustration of still another mounting structure with a plurality of engine and aircraft systems lines.

In some embodiments, referring to FIG. 12, each pylon structure 54, 56 may be configured with a single passage 86 for routing the engine and aircraft systems lines; e.g., at least one fluid line (e.g., fuel or hydraulic line) 66 and/or one or more non-fluid lines (e.g., electrical lines 68). In other embodiments, referring to FIGS. 13 and 14, each pylon structure 54, 56 may be configured with a plurality of passages 88 and 90 for routing the engine and aircraft systems lines 66 and 68. The pylon structure 54, 56 and mounting structure 70, 72 of FIG. 13, for example, includes an integral partition 92 that separates an interior bore of the tubular structure into the first passage 88 and the second passage 90. The fuel line 66 may be routed through the first passage 88 and the electrical lines 68 may be routed through the second passage 90. In this manner, the line 66 carrying a fuel source is separate from the lines 68 which could provide a source of ignition. Of course, in other embodiments, the mounting structure 70, 72 may alternatively be configured from parallel tubular structures to provide the first and the second passages 88 and 90 as illustrated in FIG. 14.

In some embodiments, referring to FIG. 15, one or more of the engine and aircraft systems lines may be configured to be severable at (e.g., on, adjacent or proximate) the interface 58 between the first pylon structure 54 and the second pylon structure 56. For example, each electrical line 68 may include a first segment 94 and a second segment 96, which is removably electrically coupled to the respective first segment 94 by, for example, an electrical coupling 98. Each of the first segments 94 is disposed within the first pylon structure 54, and each of the second segments 96 is disposed within the second pylon structure 56. The fuel line 66 may similarly include a segment 100 by, for example, a fluid coupling 104. The first segment 100 is disposed within the first pylon structure 54, and the second segment 102 is disposed within the second pylon structure 56.

Figure 16:
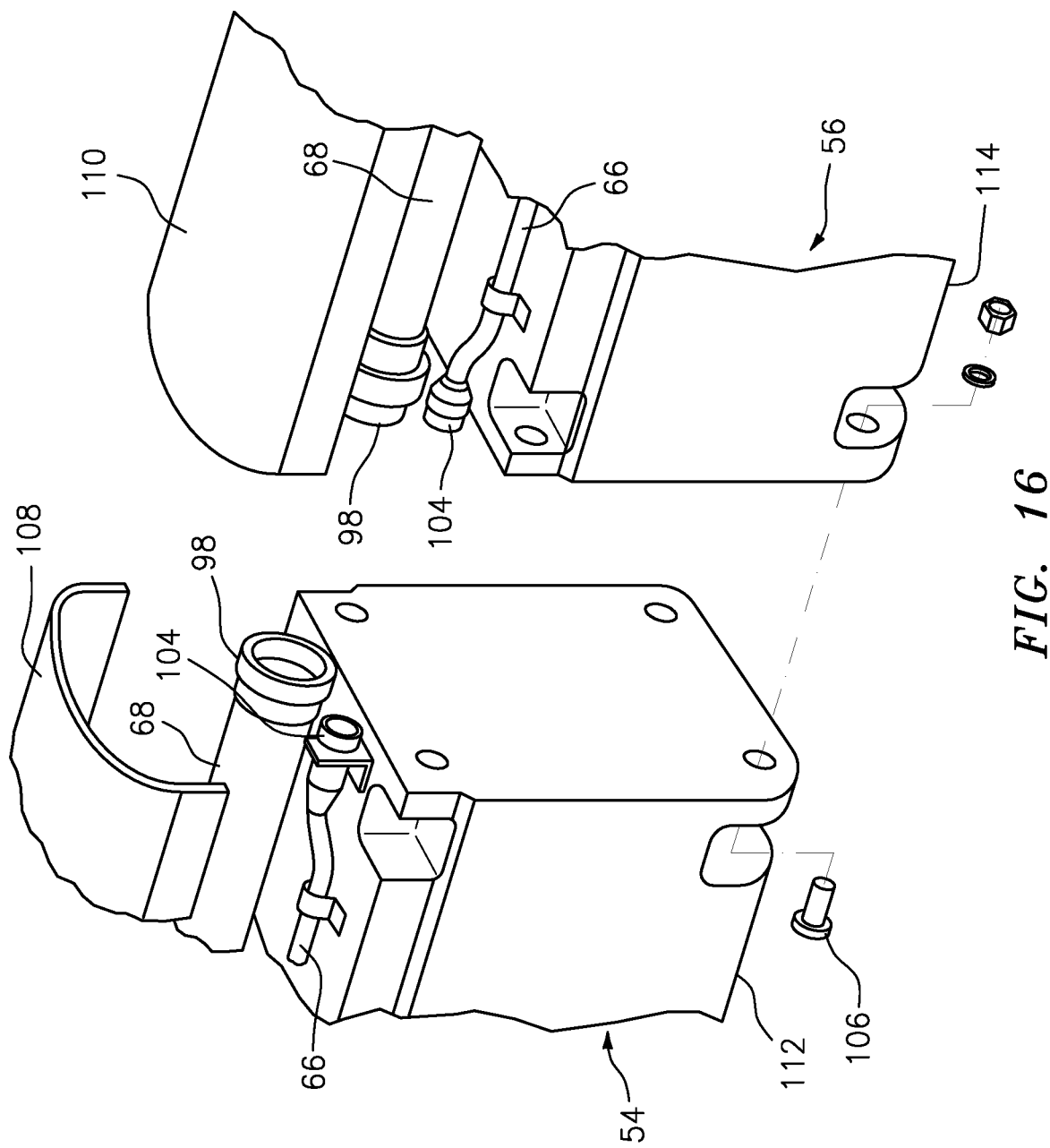
FIG. 16 is an exploded perspective illustration of the wing, another propulsion system and the pylon.

FIG. 16 illustrates another embodiment of a joint for connecting the pylon structures 54 and 56 together. More particularly, the pylon structures 54 and 56 of FIG. 16 are connected together by a butt joint, where one or more fasteners (e.g., bolt, washer and nut assemblies; one fastener 106 shown in FIG. 16 for clarity) secure the second pylon structure 56 to the first pylon structure 54. While FIG. 16 illustrates placement of a fastener (e.g., 106) at each corner of the butt joint, it is contemplated that other fastener patterns may be employed.

Each pylon structure 54, 56 shown in FIG. 16 includes a respective cowling/cover 108 and 110 and a respective base 112 and 114. The bases 112 and 114 are connected together at the butt joint by the fasteners (e.g., 106). Each cowling 108, 110 is connected to a respective base 112, 114 by one or more fasteners (not shown), and is configured to enclose and house respective portions of the lines 66 and 68. Of course, in other embodiments, the cowling 108, 110 may be configured with the respective base 112, 114 as an integral, unitary body.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. An assembly for an aircraft, comprising:
    an airframe member comprising an aircraft wing;
    an aircraft propulsion system; and
    a pylon configured to mount the aircraft propulsion system to the airframe member, the pylon including a first pylon structure and a second pylon structure;
    the first pylon structure configured to mount to the airframe member;
    the second pylon structure mounted to the aircraft propulsion system, and configured to disconnect from the first pylon structure while mounted to the airframe member;
    the aircraft wing comprising a first wing structure and a second wing structure configured to disconnect from the first wing structure when the second pylon structure is disconnected from the first pylon structure; and
    the second wing structure forming a portion of a trailing edge of the aircraft wing and is mounted to the second pylon structure.

2. The assembly of claim 1, wherein the second pylon structure is configured to disconnect from the first pylon structure by moving along a generally horizontal axis.

3. The assembly of claim 2, wherein the horizontal axis is substantially parallel to a rotational axis of the aircraft propulsion system.

4. The assembly of claim 1, further comprising:
    a fluid line including a first segment and a second segment removably coupled to the first segment at an interface between the first pylon structure and the second pylon structure;
    wherein the first segment is arranged with the first pylon structure and the second segment is arranged with the second pylon structure.

5. The assembly of claim 1, further comprising:
    a non-fluid line including a first segment and a second segment removably coupled to the first segment at an interface between the first pylon structure and the second pylon structure;
    wherein the first segment is arranged with the first pylon structure and the second segment is arranged with the second pylon structure.

6. The assembly of claim 1, wherein the pylon is further configured to mount the aircraft propulsion system at least substantially vertically above the aircraft wing.

7. The assembly of claim 1, wherein the pylon is further configured to mount the aircraft propulsion system at least substantially aft of the aircraft wing.

8. The assembly of claim 1, the first pylon structure is connected to the second pylon structure at a butt joint.

9. The assembly of claim 1, wherein the pylon is further configured to mount the aircraft propulsion system at least substantially vertically above the aircraft wing.

10. The assembly of claim 1, wherein the pylon is further configured to mount the aircraft propulsion system at least substantially aft of the aircraft wing.

* * * * *